United States Patent [19]

Wehmeyer et al.

[11] Patent Number: 4,691,795
[45] Date of Patent: Sep. 8, 1987

[54] VEHICLE FLUIDIC DRIVE CIRCUIT

[75] Inventors: Donald T. Wehmeyer, Woodinville, Wash.; Ronald W. Barnhart, Elmhurst, Ill.

[73] Assignee: Economy Engineering, Inc., Bensenville, Ill.

[21] Appl. No.: 746,786

[22] Filed: Jun. 18, 1985

Related U.S. Application Data

[63] Continuation-in-part of Ser. No. 279,934, Jul. 2, 1981, abandoned, and Ser. No. 467,908, Feb. 18, 1983, abandoned.

[51] Int. Cl.$^4$ ............... B62D 11/04; F16D 65/24
[52] U.S. Cl. ........................ 180/6.48; 91/443; 91/514; 91/532; 137/100; 137/596.16; 137/625.64; 137/884; 180/197; 180/306
[58] Field of Search .............. 180/6.48, 197, 6.2, 180/305, 306, 307, 308, 291, 294, 295, 296, 298, 299, 11.12; 280/DIG. 5; 60/426, 428, 455; 137/887, 596.16, 625.64, 100; 91/443, 508, 514, 515, 532

[56] References Cited

U.S. PATENT DOCUMENTS

| | | | |
|---|---|---|---|
| 3,154,925 | 11/1964 | De Vita | 60/426 |
| 3,195,669 | 7/1965 | Court | 180/305 |
| 3,595,334 | 7/1971 | Issac | 180/197 |
| 3,987,626 | 10/1976 | Bianchetta | 180/6.48 X |

FOREIGN PATENT DOCUMENTS

| | | | |
|---|---|---|---|
| 2538677 | 3/1977 | Fed. Rep. of Germany | 180/6.48 |
| 2807351 | 8/1981 | Fed. Rep. of Germany | 180/197 |
| 3107991 | 9/1982 | Fed. Rep. of Germany | 180/305 |
| 315211 | 9/1969 | Sweden | 180/305 |
| 9105 | 11/1980 | U.S.S.R. | 180/305 |

Primary Examiner—John J. Love
Assistant Examiner—Mitchell J. Hill
Attorney, Agent, or Firm—Douglas B. White

[57] ABSTRACT

There is provided an improved fluidic drive circuit for a fluid powered vehicle arranged to limit flow to an unloaded drive wheel. A restricting orifice is mounted in parallel with a pressure sensitive control valve to provide fluid power to the motor. A trickle flow is provided through the restricting orifice to maintain a minimum pressure to the fluid motor. The control valve, sensitive to pressure at the fluid motor, provides full flow only when the pressure in the fluid motor is sufficient.

3 Claims, 12 Drawing Figures

VEHICLE FLUIDIC DRIVE CIRCUIT

This is a continuation in part of application Ser. No. 279,934, filed July 2, 1981, and application Ser. No. 467,908, filed Feb. 18, 1983, by Applicants Donald T. Wehmeyer and Ronald W. Barnhart, both abandoned.

BACKGROUND OF THE INVENTION

This invention relates generally to the field of mobile work platforms and particularly to those of a vehicular nature being supported and driven on wheels and controlled by an operator riding on the platform. Accordingly, it has always been a problem in the prior art to provide accurate and efficient control of the power drive to the wheels and to provide accurate and efficient steering control of the vehicle. More particularly, there has been a long felt need to provide efficient means to reduce power to a wheel when an unloaded condition such as slippage occurs and to subsequently and automatically increase the power when traction is regained. Although a number of solutions have been proposed, such as U.S. Pat. No. 3,154,925 issued to DeVita, which provides a pair of fluid pressure operated motors and a pilot valve arranged to close the fluid pressure line to a first motor in proportion to the pressure in the opposite motor, independent control of the separate fluid motors is not attained and should both wheels slip, the system fails to operate. It is this independent fluid motor control accomplished by the present invention which is required to prevent loss of fluid pressure during wheel slippage.

In order to overcome the aforemention problems in the prior art, an improved mobile work platform having complete operator control from the elevating platform is disclosed herein. There is provided an improved power delivery system to the drive wheels whereby power is controlled and limited to prevent power drainage by a slipping wheel.

SUMMARY OF THE INVENTION

It is accordingly a primary object of the present invention to provide an improved mobile work platform having improved mobility, safety and control through a power control system which efficiently and safely reduces power to an unloaded wheel and automatically resumes power when the load is reapplied.

Generally there is provided an improved vehicle drive system powered by fluid power motors. Fluidic circuitry is further provided for directing fluid power from a compressor system through appropriate conduits to the fluid motors, while proximate to the fluid motors there is provided in combination a restricting orifice and piloted control valve to provide pressure controlled flow to the fluid motors.

Other objects and advantages of the invention will become apparent upon reading the following detailed description and upon reference to the drawings.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

DESCRIPTION OF THE PREFERRED EMBODIMENT

Figure 1:
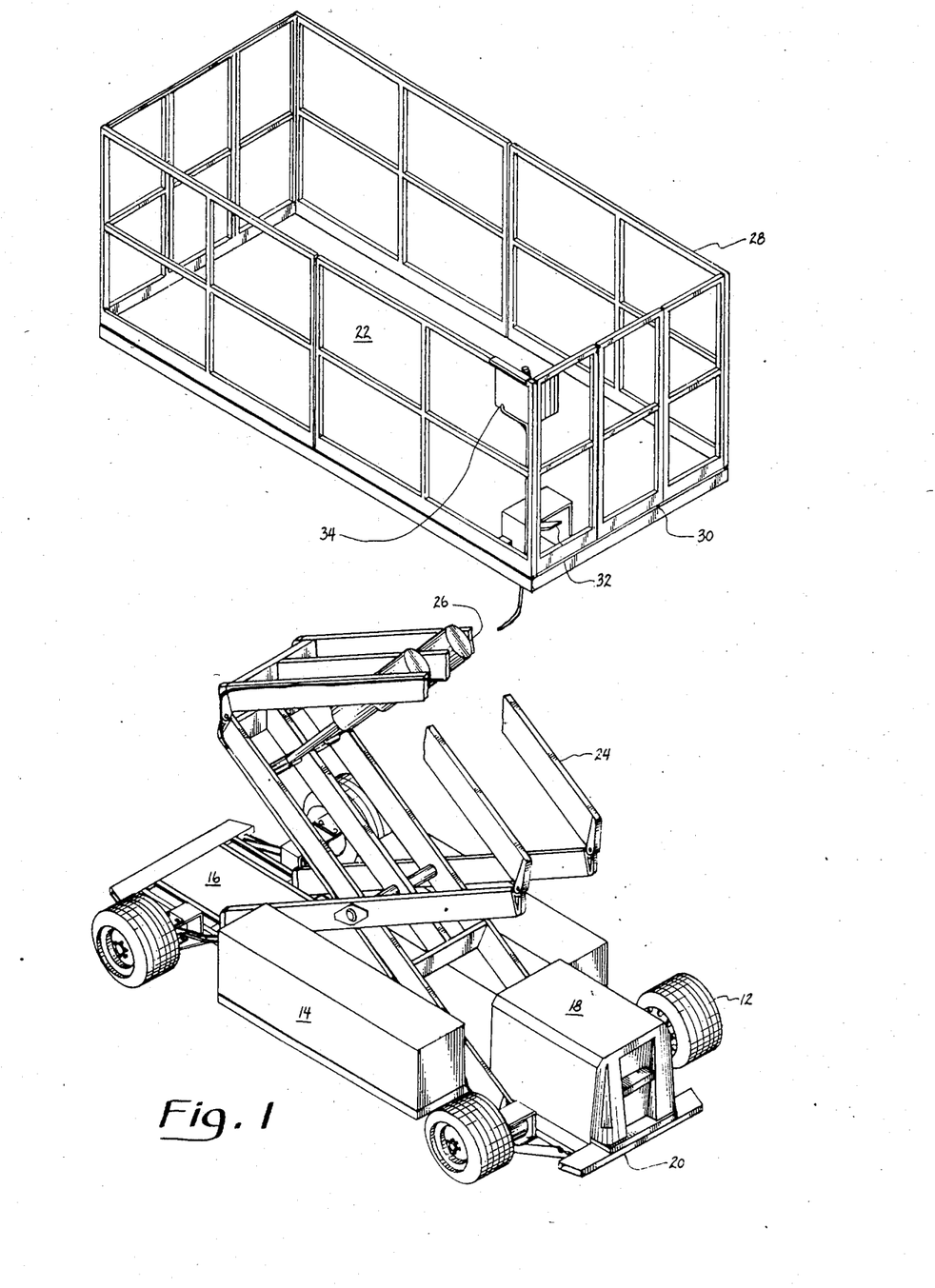
FIG. 1 is a perspective view of a mobile elevating work platform vehicle of the present invention showing the work platform, the lifting mechanism, and the wheeled vehicles.
Figure 3:
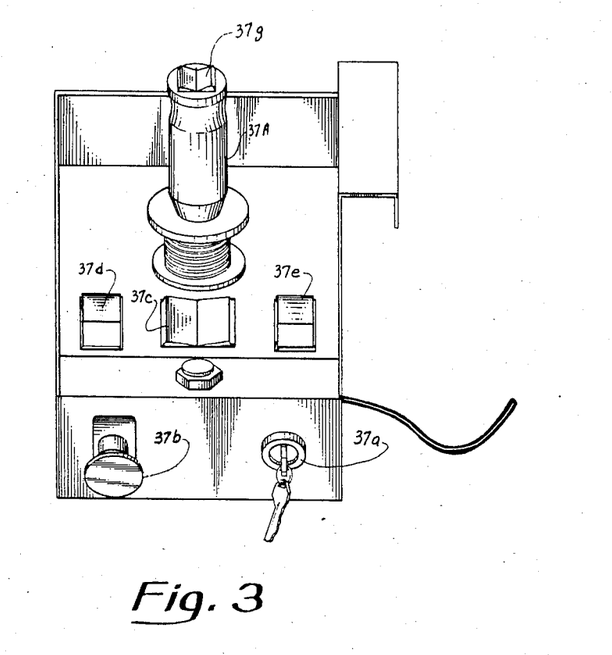
FIG. 3 is a perspective view of the control panel of the work platform vehicle.
Figure 4:
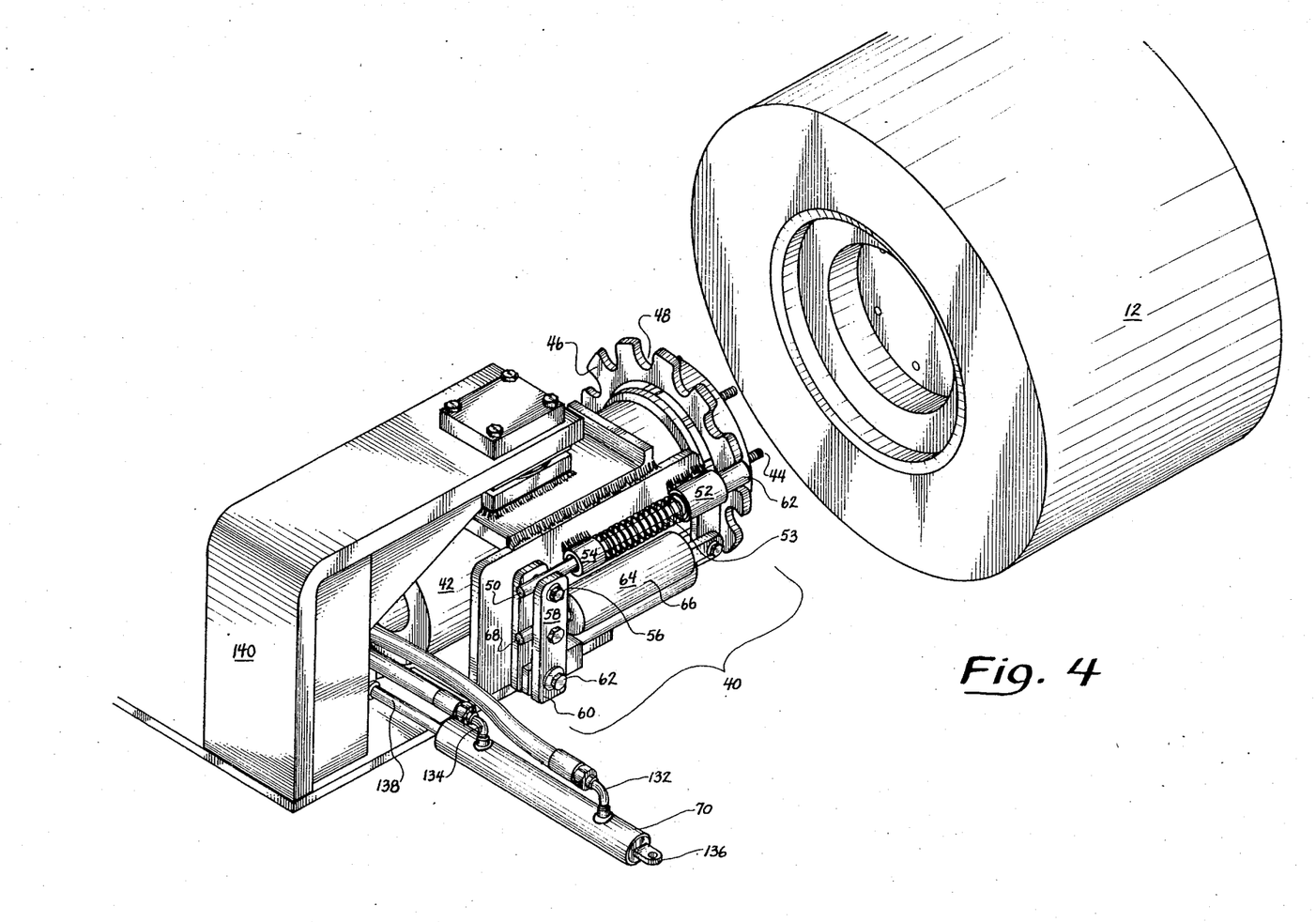
FIG. 4 is a perspective view of the automatic braking system mechanism for the mobile work platform vehicle.

Turning first to FIG. 1, there is shown a pictorial view, partially cut away, of a mobile work platform vehicle having four wheels 12 located in front and rear pairs on each extremity thereof. Arranged in opposing relationship on alternate sides of the vehicle are side storage boxes 14 containing items such as portable fuel cells and a starter battery. Also located on the main vehicle frame 16 is the removable power module 18 which is efficiently removed by unbolting a single manifold. Fork lift pockets 20 are shown at the front end thereof to provide convenient means for removing the disconnected power module. Riding on top of the elevating mechanism is the work platform 22 having a safety railing 28 with entrance gates 30 and having a power control pedal 32 and a control lever 34 (more fully shown in FIG. 3).

Figure 2:
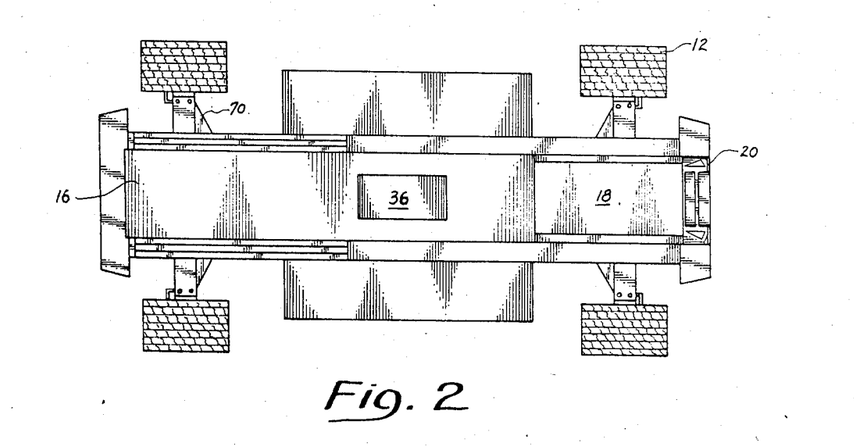
FIG. 2 is a plan view of the vehicle of FIG. 1.
Figure 7:
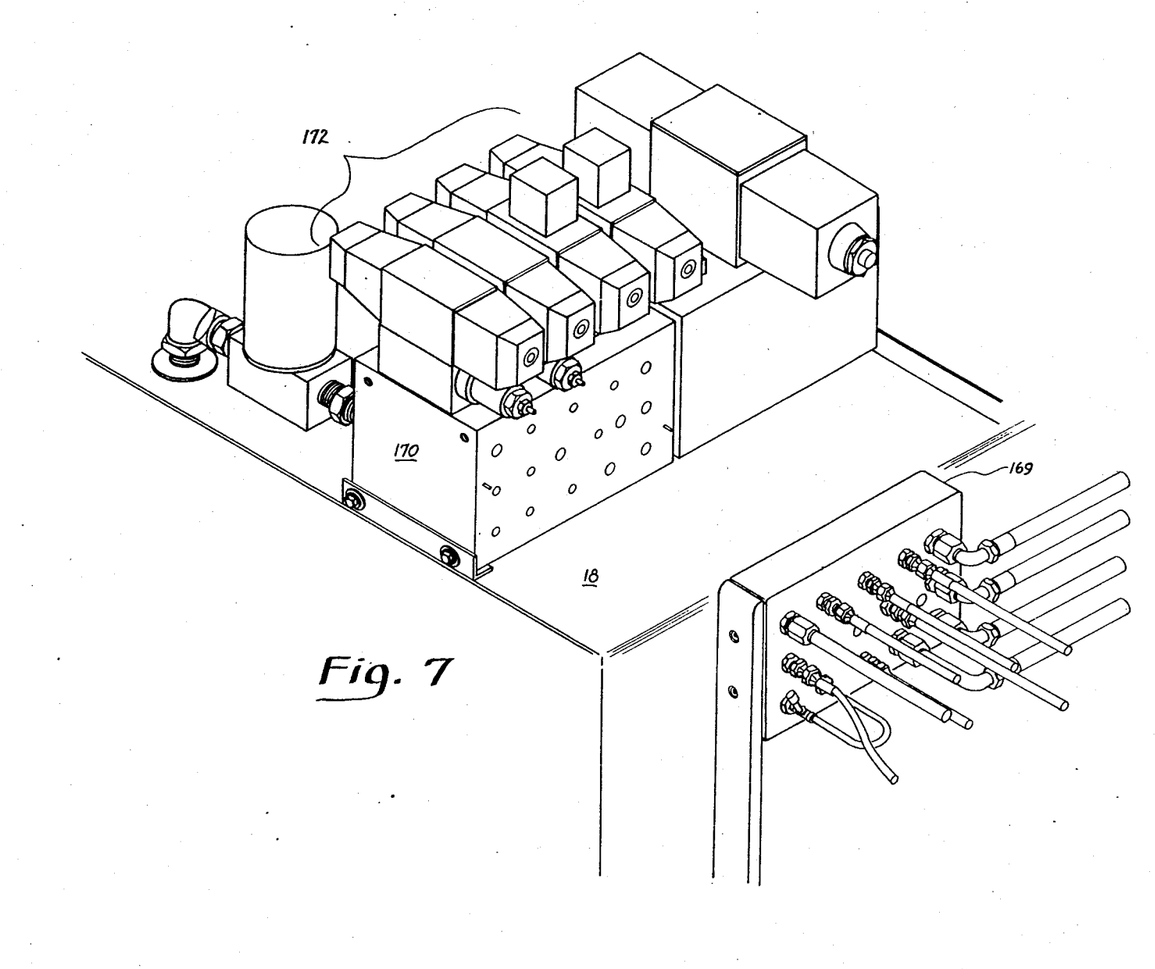
FIG. 7 is a perspective view of the power manifold showing a quick disconnect feature.
Figure 8:
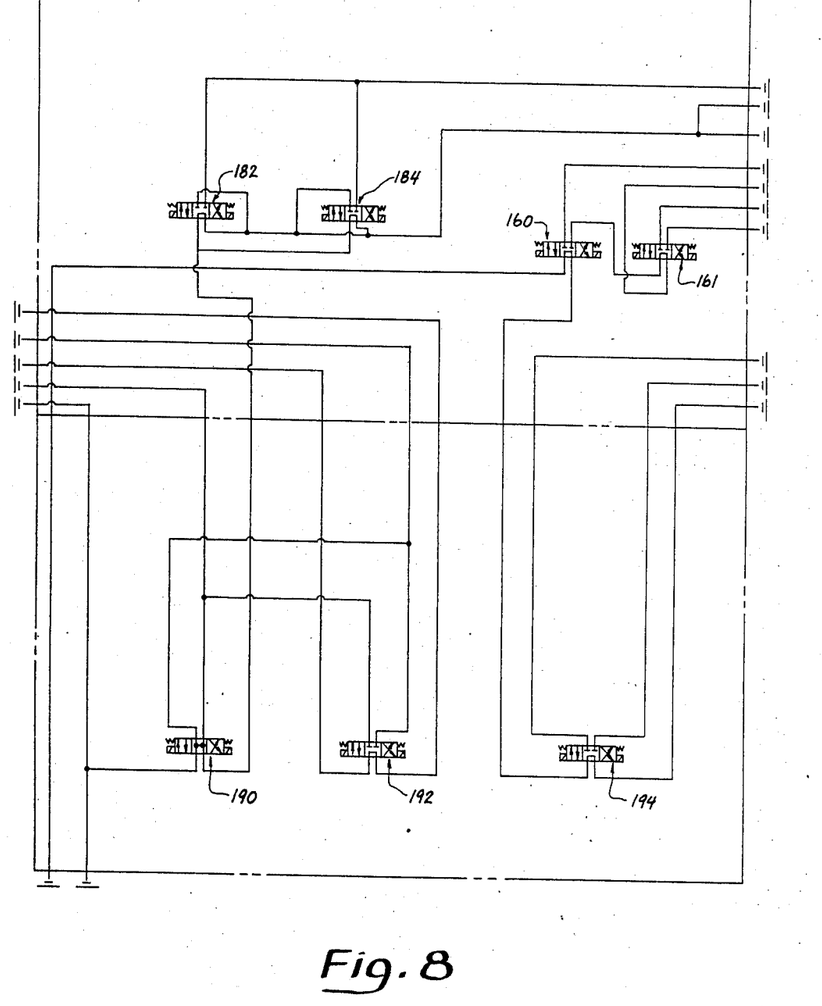
FIG. 8 is a schematic of the fluidic circuitry within the power manifold of FIG. 7.

Turning now to FIG. 2, there is shown a plan view of the vehicle of FIG. 1 showing the relative relationship of the power module 18 on the frame 16 and showing the centralized location 36 of the fluid circuitry including the improved power control circuitry and the manifold developed therefor. From this centralized location the power to the wheels is monitored and controlled, with the speed and direction of the vehicle being controlled through a plurality of solenoids mounted thereon as more fully shown in FIG. 7.

The joy stick control panel (fully shown in FIG. 3) has an on/off key access 37a, an emergency stop button 37b, a lift/drive system selector 37c, and rocker switches 37d and 37e to select between platform up and down motion and between four wheel/two wheel/crab steering. The joy stick 37f is pushed for forward motion and pulled for reverse while the rocker switch 37g on its extremity is pushed on its left for left steering and on its right for right steering.

Figure 10:
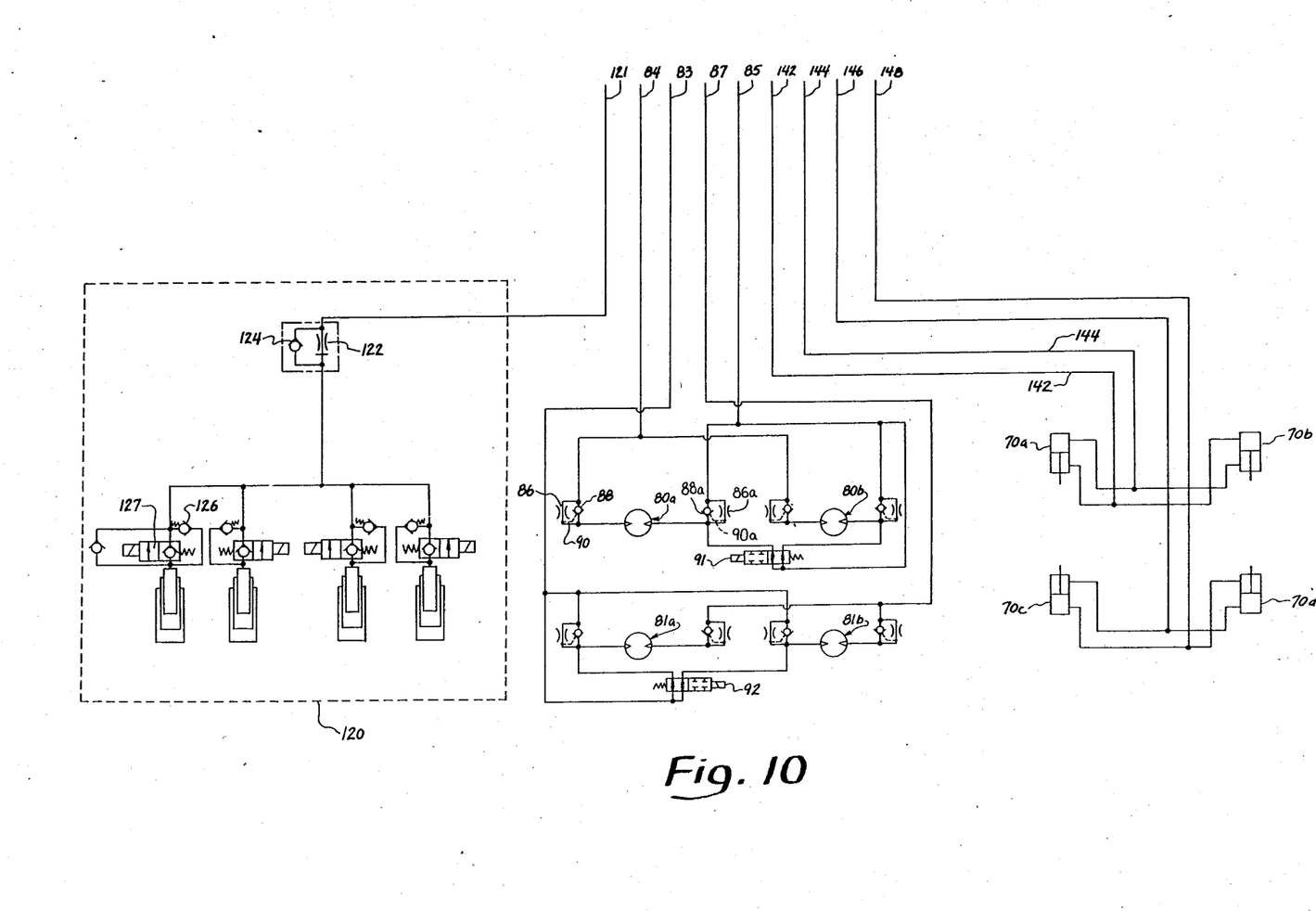
FIG. 10 is the remaining part of the fluidic circuitry schematic of FIG. 9.

Turning now to FIG. 10, the power control of the drive motors on the vehicle may be more fully understood. Specifically, there are provided multiple fluid pressure drive motors 80a, 80b, 81a and 81b, corresponding to each drive wheel of the vehicle with each motor arranged for bi-directional operation. When fluid pressure is applied for forward operation of the front wheels through the incoming power conduit 84 (83 for the rear wheels) it is directed to the fluid motors 80a, 80b through a parallel path combination of a fixed orifice 86 and a pressure sensitive control valve 88. This fixed orifice maintains a narrowed passage to the fluid motor and, with a steady pressure from the conduit 84, provides a steady trickle of flow to the fluid motor. Pressure sensitive means such as a pressure control line to a pressure controlled valve is used to provide pressure controlled flow to the fluid motors. The pressure controlled valve 88 is arranged to carry full flow to the fluid motor 80a under normal conditions, but to shut off full flow to the motor when the sensing line 90 senses a low pressure condition on the motor side of the control valve. When the low pressure is sensed, an unloaded or slippage condition has occurred and the control valve closes to prevent loss of power in the fluidic system. During the time that the control valve is closed, the fixed orifice continues to provide a steady trickle of flow so that pressure will rebuild quickly after traction is regained. As the pressure rebuilds to a predetermined level, the pressure controlled valve senses the return of pressure and reopens to provide full flow to the fluid motor. Each motor, both front and rear as shown in FIG. 10, has this flow controlling circuitry for both forward and reverse operation of the fluid motor with conduits 85 and 87 providing the reverse flow for reverse operation.

During forward flow, fluid passes through a first restricting orifice 86 mounted proximate to the first inlet to the fluid pressure driven motor 80a with the second inlet now acting as an outlet to provide a steady controlled flow therethrough. A parallel path for fluid flow to the motor is provided through a first control valve 88 mounted proximate the first inlet to the motor. This control valve is controlled by a first pressure sensitive means 90 arranged to close the control valve when pressure at this first inlet to the motor falls below a predetermined pressure.

During reverse flow, fluid passes through a second restricting orifice 86a mounted proximate the second inlet to the motor 80a with the first inlet now acting as the outlet. A parallel path for fluid to the motor is provided through a second control valve 88a and second pressure senstiive means 90a is arranged to close the second control valve when pressure at this second inlet during this reverse flow falls below a predetermined pressure.

In a related aspect of the present invention, solenoid controlled bypass valves 91 and 92 are provided to short circuit the return of fluid passing through the fluid motor to bypass the reverse direction flow control circuitry. This solenoid bypass is arranged to provide the bypass function when the motors are powered in the forward direction to maximize forward power. In FIG. 10 the solenoid valves are both shown in the bypass condition. With the valve in the alternative setting, shifted against the spring (shown schematically in FIG. 10), the short circuit flow is blocked and the fluid motors will be driven in their reverse direction through the flow control circuitry.

Figure 11:
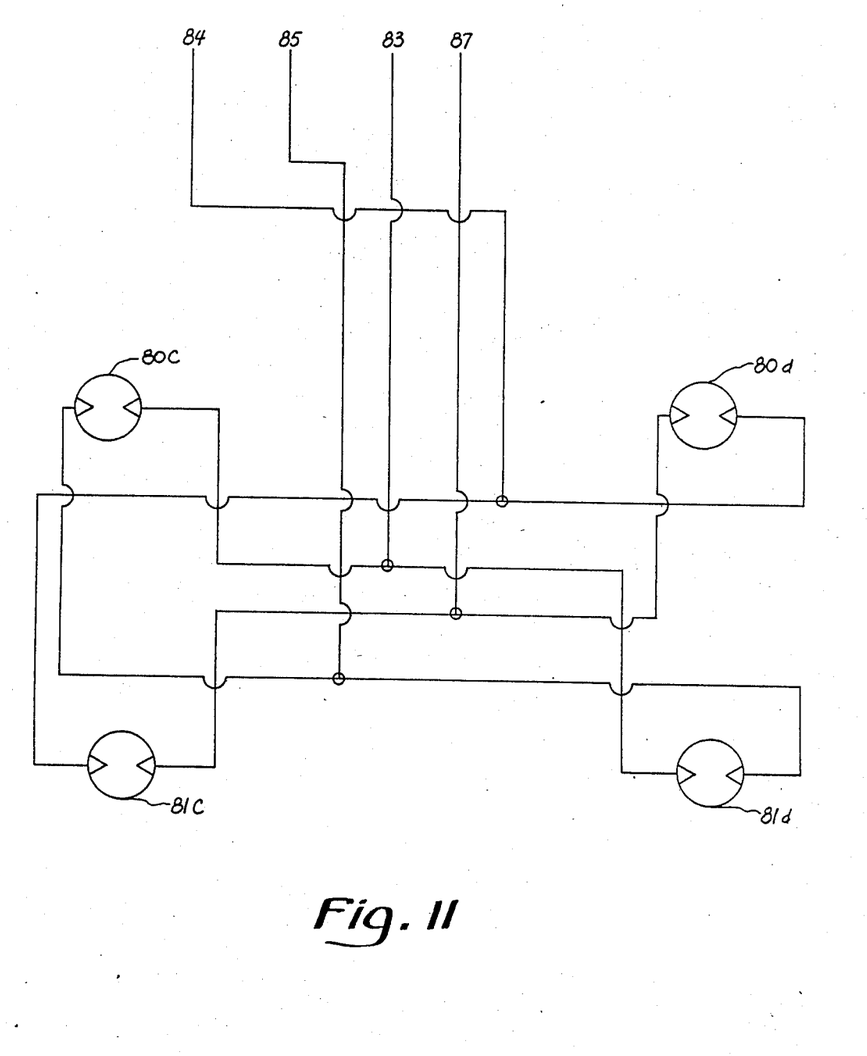
FIG. 11 is a schematic of an alternate embodiment of the fluid drive circuit.

In an alternate embodiment, the drive circuit shown in FIG. 11 may be incorporated to ensure both front and rear wheel drive where traction is lost at a front or rear wheel. Turning now to FIG. 11, there is shown the alternate fluid drive circuit having front wheel motors 80c and 80d and rear wheel motors 81c and 81d. Pressure line 84 is shown connected to the right front motor and the left rear motor, while pressure line 83 is shown connected to the left front motor and the right rear motor. Similarly, the tank line 85 is now shown connected to the left front and right rear motors while the tank line 87 is connected to the right front and left rear. Consequently, a front motor is operated in parallel with a rear motor and drive is provided at both front and rear even though a front or rear wheel may encounter slippage. Reverse operation is easily obtained by reversing the pressure and tank lines, as the motors are bi-directional.

Figure 5:
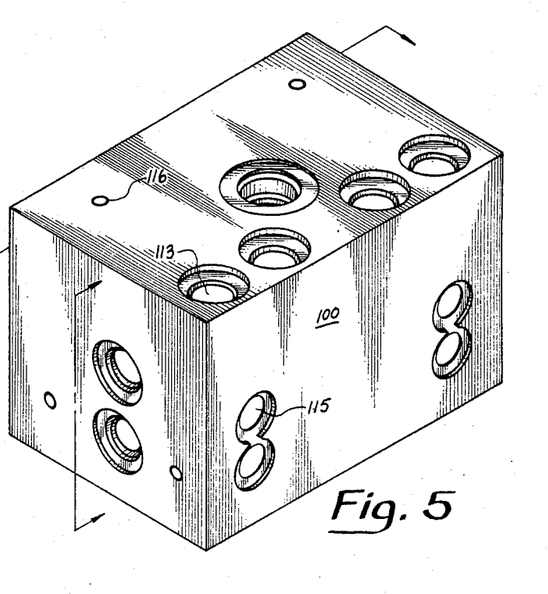
FIG. 5 is a perspective view of a manifold containing the fluidic power control circuitry of the present invention.
Figure 5A:
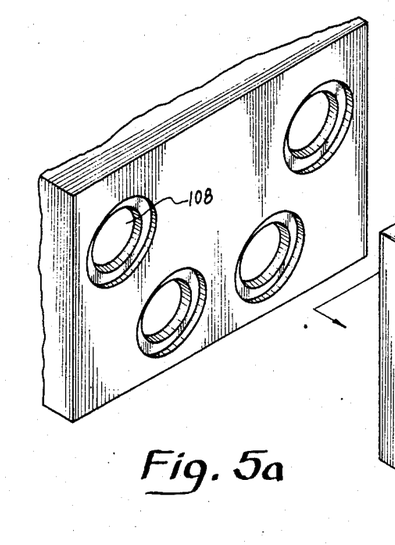
FIG. 5a is a view of the rear side of the manifold of FIG. 5.
Figure 6:
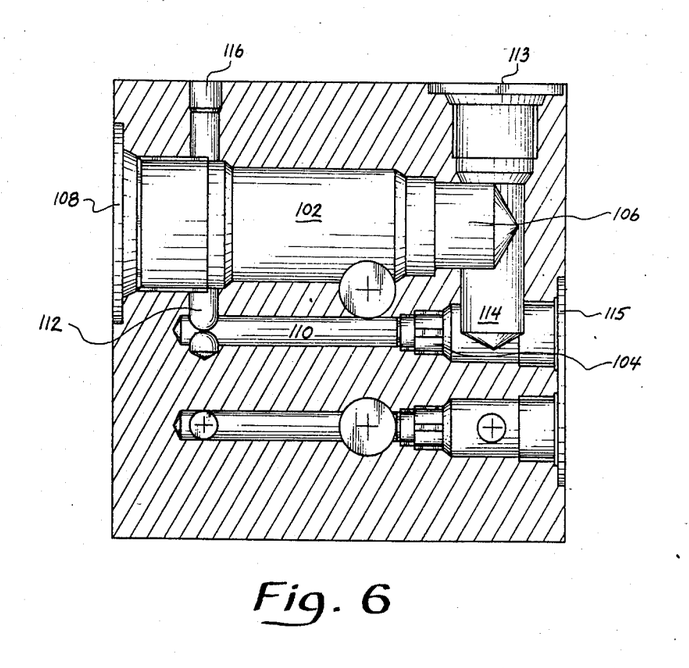
FIG. 6 is a cross sectional view of the manifold of FIG. 5.

Turning now to FIGS. 5, 5a, and 6, there is shown a preferred embodiment of the fluid power flow control circuitry previously discussed. The manifold 100 shown by these figures is arranged to contain four fluid pressure control valves 102 and four restricting orifices 104. This is accomplished by drilling in this manifold block multiple fluid passageways to establish the required fixed orifice in a position to bypass the pressure control valve installed in the manifold. With the proper seating within the manifold, components of the pilot check valve are installed and arranged to block flow when the pressure at its downstream extremity 106 drops to a low pressure. The fluid flow is input at the orifice 108 and the flow is split with one stream directed into the pressure controlled valve 102; the secondary stream is directed to the fixed orifice 104 through the bypass channel 110 and the drilled connection 112. The trickle through the fixed orifice is returned to the outlet 113 through the outlet boring 114 creating an exit orifice. Once drilled, the unnecessary access passageways 115 and 116 are plugged. In a completed vehicle having four wheel drive capability with both forward and reverse operation, a second manifold block is similarly installed to control the second set of drive motors.

Figure 9:
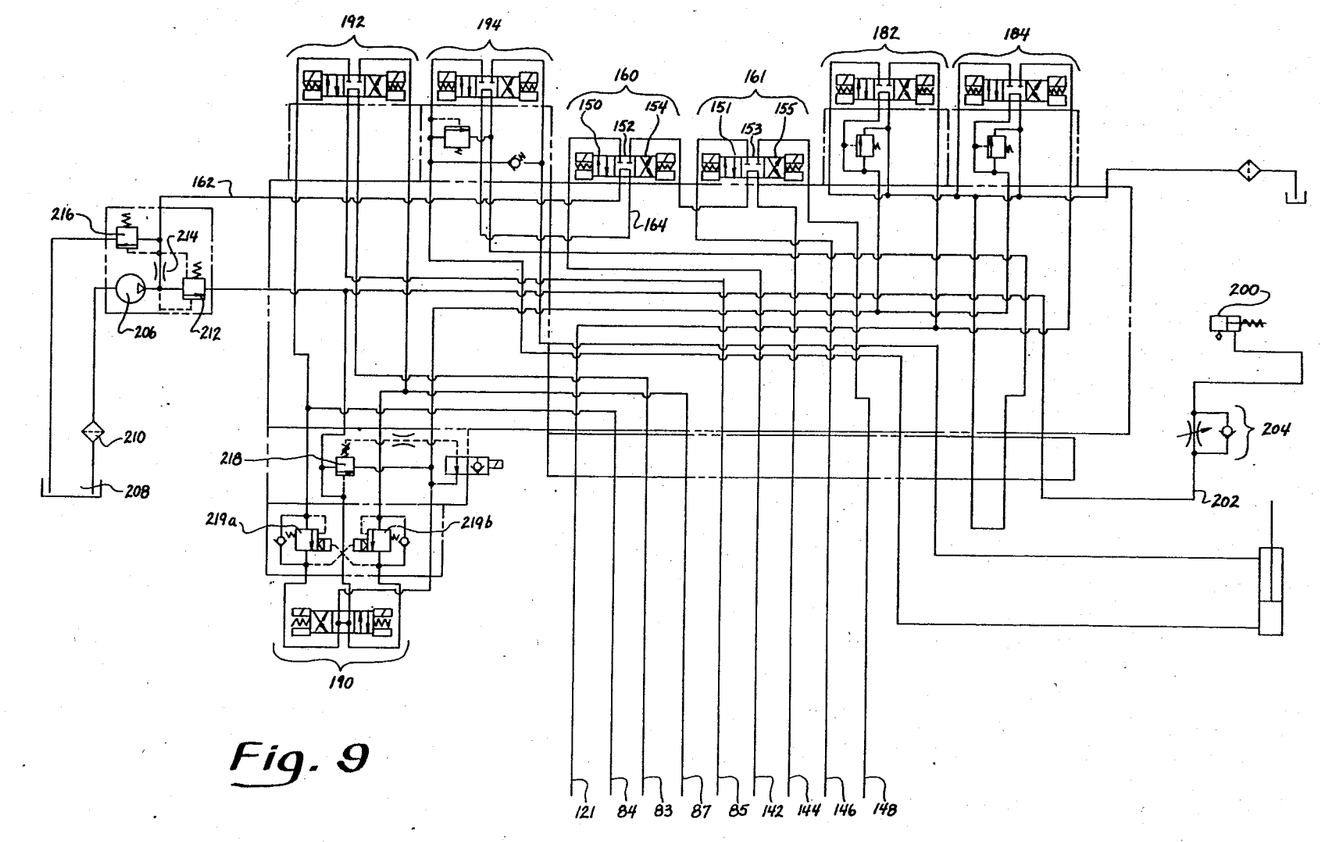
FIG. 9 is is a part of the schematic of the fluidic circuitry for the present invention including the circuitry for the brakes, the power control features and the lift cylinder control circuitry.

In further explanation of the schematic of FIGS. 9 and 10, there is shown in FIG. 9 the reservoir 208 for holding the fluid, such as oil, which is pumped by the pressure generating pump 206 through a filter 210. A relief valve 212 is provided to control the pressure to the system and a flow restrictor 214 is arranged to provide a priority of flow to the drive system over the other systems. A further pressure relief valve 216 is provided to return fluid flow to the tank when the pressure in the system becomes excessive.

The drive system is generally controlled by the solenoid operated valve 190 but the flow thereto is passed first through a vented relief valve 218 to provide a constant flow to the drive systems independent of the pressure, while dual counterbalance valves 219a and 219b create a hydraulic braking effect to prevent a freewheeling condition.

In summary, there has been shown and described an improved drive system for a vehicle supported by a plurality of wheel sets with each wheel powered by a fluid pressure operated motor. In a further aspect of the present invention, there has been described an improved fluid control system for limiting flow to an unloaded drive wheel having a restricting orifice mounted in a parallel flow relationship with a pressure sensitive control valve. A trickle flow is provided to maintain a minimum pressure to the fluid motor and the control valve, sensitive to pressure at the fluid motor, provides full flow when the pressure in the fluid motor is sufficient.

We claim:

1. In a fluid powered vehicle, a fluid power system for controlling driving torque to a drive wheel of the vehicle comprising:
 - a fluid pressure driven motor mounted in driving engagement with the driving wheel of said vehicle;
 - a restricting orifice mounted proximate said fluid pressure driven motor within the fluidic circuit directing power thereto, for providing constant but limited flow of fluid to said pressure driven motor;
 - a control valve mounted within said fluidic circuit proximate said fluid pressure driven motor in said fluidic circuit and providing, with respect to said restricting orifice, a parallel path to said fluid pressure driven motor for said fluid pressure; and
 - a pressure sensing line connected between said control valve and the inlet to said fluid pressure driven motor and arranged to maintain said control valve open while the pressure at the inlet to said fluid pressure driven motor remains above a predetermined pressure and to close said control valve when the pressure at the inlet to said fluid pressure driven motor falls below a predetermined pressure.

2. In a fluid powered vehicle, a fluid power control system comprising a fluid pressure driven motor having a first and second inlet and arranged for bi-directional motion, and further comprising a first restricting orifice mounted proximate said first inlet to said fluid pressure driven motor to provide a steady controlled fluid flow therethrough, a first control valve mounted proximate said first inlet to said fluid pressure driven motor to provide a parallel path for fluid flow to said fluid pressure driven motor, and a
 - first pressure sensing line connected between said first control valve and said first inlet to said fluid pressure driven motor and arranged to maintain said first control valve open while the pressure at said first inlet to said fluid pressure driven motor remains above a predetermined pressure and to close said first control valve when the pressure at said first inlet to said fluid pressure driven motor falls below a predetermined pressure;
 - and further comprising a second restricting orifice mounted proximate said second inlet to said fluid pressure driven motor to provide a steady controlled flow therethrough, a second control valve mounted proximate said second inlet to said fluid pressure driven motor to provide a parallel path for fluid flow to said fluid pressure driven motor; and a
 - second pressure sensing line connected between said second control valve and said second inlet to said fluid pressure driven motor and arranged to maintain said second control valve open while the pressure at said second inlet to said fluid pressure driven motor remains above a predetermined pressure and to close said second control valve when the pressure at said second inlet to said fluid pressure driven motor falls below a predetermined pressure.

3. In a fluid powered vehicle having paired first and second drive wheels and having first and second fluid pressure driven motors mounted in driving engagement with said respective drive wheels, paired first and second power control circuitry wherein
 - said first power control circuitry is comprised of a first fluid pressure driven motor having a first and a second inlet and arranged for bi-directional motion, and further comprising a first restricting orifice mounted proximate said first inlet to said first fluid pressure driven motor to provide a steady controlled fluid flow therethrough, a first control valve mounted proximate said first inlet to said first fluid pressure driven motor to provide a parallel path for fluid flow to said fluid pressure driven motor, and a first pressure sensitive means for closing said first control valve when the fluid pressure at said first inlet to said first fluid pressure driven motor falls below a predetermined pressure; and further comprising a second restricting orifice mounted proximate said second inlet to said first fluid pressure driven motor to provide a steady controlled flow therethrough, a second control valve mounted proximate said second inlet to said first fluid pressure driven motor to provide a parallel path for fluid flow to said fluid pressure driven motor, and a second pressure sensitive means for closing said second control valve when the fluid pressure at said second inlet to said first fluid pressure driven motor falls below a predetermined pressure; and wherein
 - said second power control circuitry is comprised of a second fluid pressure driven motor having a first and a second inlet and arranged for bidirectional motion, and further comprising a first restricting orifice mounted proximate said first inlet to said second fluid pressure driven motor to provide a steady controlled fluid flow therethrough, a first control valve mounted proximate said first inlet to said second fluid pressure driven motor to provide a parallel path for fluid flow to said fluid pressure driven motor, and a first pressure sensitive means for closing said first control valve when the fluid pressure at said first inlet to said second fluid pressure driven motor falls below a predetermined pressure; and further comprising a second restricting orifice mounted proximate said second inlet to said second fluid pressure driven motor to provide a steady controlled flow therethrough, a second control valve mounted proximate said second inlet to said second fluid pressure driven motor to provide a parallel path for fluid flow to said fluid pressure driven motor, and a second pressure sensitive means for closing said second control valve when the fluid pressure at said second inlet to said second fluid pressure driven motor falls below a predetermined pressure; and further comprising
 - a solenoid controlled valve arranged to bypass said second control valve of said first power control circuitry and said second control valve of said second power control circuitry to provide improved efficiency during a first direction of travel.

* * * * *